United States Patent [19]

Hiraba

[11] Patent Number: 4,462,683
[45] Date of Patent: Jul. 31, 1984

[54] METHOD OF PREPARATION OF PATTERN DESIGNS FOR PRINTING

[76] Inventor: Kohtaroh Hiraba, 4-4-3, Nihonbashi Naniwa-ku, Ohsaka-shi, Ohsaka-Fu, Japan

[21] Appl. No.: 427,459

[22] Filed: Sep. 29, 1982

Related U.S. Application Data

[63] Continuation of Ser. No. 219,920, Dec. 24, 1980, abandoned.

[30] Foreign Application Priority Data

Nov. 5, 1980 [JP] Japan ................................ 55-154708

[51] Int. Cl.$^3$ ............................................ G03B 27/32
[52] U.S. Cl. ........................................ 355/77; 353/30; 355/52

[58] Field of Search ........................ 355/77, 52; 353/30

[56] References Cited

U.S. PATENT DOCUMENTS 3,683,779 8/1972 Lifton .................................... 353/30

Primary Examiner—Monroe H. Hayes
Attorney, Agent, or Firm—Fred Philpitt

[57] ABSTRACT

Disclosed is a method of the preparation of pattern designs for printing, in which a shadow of an opaque article having a specific shape and structure, which is interposed between two confronting polarizing plates, is utilized and a basic original photograph is prepared by superposing the shadow of the specific shape and structure integrally on an interference pattern.

6 Claims, 9 Drawing Figures

FIG. 2
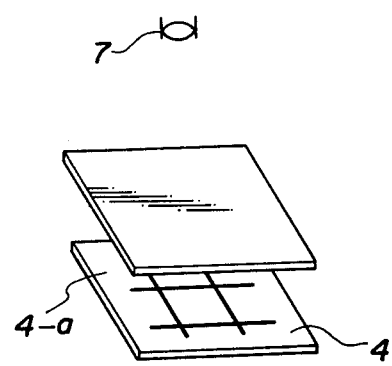
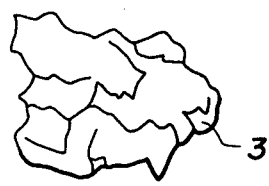
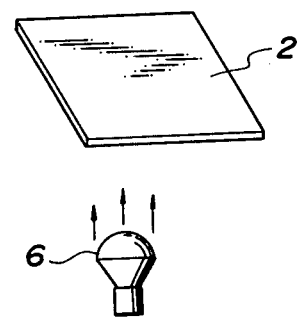

METHOD OF PREPARATION OF PATTERN DESIGNS FOR PRINTING

This application is a continuation of application Ser. No. 219,920, filed Dec. 24, 1980, now abandoned.

DESCRIPTION OF THE PRIOR ART

As the conventional method for preparing pattern designs for printing, there is known a method in which an original photograph is prepared by forming an interference color by a polarizing plate and photographing a shape and structure formed by the interference color and a desired printing pattern design is prepared based on this original photograph through predetermined process steps. This technique of photographing a shape and structure of an interference color formed by a polarizing plate and catching such shape and structure as an image was developed as the technique of inspecting and detecting the distortion state of a plastic material or the state of incorporation of a mineral material in a plastic material by interposing the plastic material between a polarizing plate and Nicol's prism, projecting light beams to the assembly and inspecting the resulting interference color, and this technique was practically utilized in a mineral-detecting polarizing microscope. The hue, shape and pattern of this interference color are elegant, imaginary and beautiful and are full of delicate lines and forms. Accordingly, this technique was further developed and as the result, there was provided a design-preparing method in which specific hue, shape and pattern formed by such interference color are utilized as basic units of the design.

According to this conventional method, only a light-interfering article such as a cellophane film is interposed between confronting polarizing plates (filters) and an optical image formed by changing the hue and pattern of the interference color while rotating and moving these polarizing plates by a manual operation is caught and photographed. Therefore, the hue, shape and pattern of the interference color depend merely on contigency and they have no reproducibility. Furthermore, the systematic study of interference color patterns is impossible and discontinuous or irregular hues, shapes and patterns are often manifested. Accordingly, in order to obtain printing designs having a high commercial value, it is necessary to find highly utilizable and valuable portions among such discontinuous or irregular hues, shapes and patterns, separate these portions, arrange one or more of these portions as basic units and montage and re-arrange these units to obtain a design having a commercial value as a whole.

In combining and arranging basic units, in order to obtain a design which is not unnatural in any of the longitudinal, lateral and oblique directions, it is necessary to strictly adjust the connecting relation among the basic units. Furthermore, the operations of finding basic design units in original photographs, tracing the portions of basic units, separating the basic units, combining the separated basic units and arranging and adjusting the basic units are performed in succession, for example, through the steps of finding valuable design unit portions in negative plates of photographs, marking the portions to be separated, separating and cutting the marked portions and combining, arranging and adjusting these unit portions. Among these steps, those of finding basic design units and indicating cutting lines are carried out quite separately from the operation of obtaining original photographs, that is, the photographing process. Accordingly, these steps should be carried out independently while watching and inspecting photographic negative plates one by one after the photographing process, and therefore, these steps require large quantities of time and labor. Moreover, when formation of photographic negative plates and formation of basic units, that is, selection or determination of portions to be separated, are carried out by different persons, the intention of the person forming the photographic negative plates is not sufficiently utilized, and the formed plates are not effectively used but discarded, resulting in economical disadvantages.

These problems involved in the conventional technique of preparing printing designs by using polarizing plates are summarized as follows.

(1) Since polarizing plates and the like are handled by a manual operation, the hue or pattern of an interference color has no reproducibility, and systematic study or analysis thereof is quite impossible.

(2) Accordingly, it is impossible to collect data of regular, continuous and morphologic changes of the hue and pattern of an interference color.

(3) Since accumulation of data with good reproducibility is insufficient, accidentally obtained design units cannot but be utilized as basic units, and large quantities of time and labor are necessary for finding basic units from many original photographs and separating portions of these units by cutting.

(4) Since formation of original photographs and formation of basic design units are carried out quite independently according to different processes, the design-preparing process becomes complicated as a whole.

(5) The intention of a person forming original photographs is not precisely transferred to a person forming basic designs, and it often happens that the formed original photographs are not effectively utilized.

(6) Since accumulation of analysis data is insufficient, the application range is considerably restricted.

Under such background, it has eagerly been desired in the art to develop a process in which the foregoing problems involved in the conventional techniques can be solved, interference color patterns by polarizing plates can be reproduced repeatedly according to need, systematic study and analysis of kinds of interference color patterns and accumulation of basic data become possible, and printing designs having a high commercial value can be prepared at a high efficiency economically advantageously and very simple while saving labors. However, a technique meeting such desire has not yet been developed.

BRIEF SUMMARY OF THE INVENTION

Under such background, we made researches with a view to developing a new technique meeting the above desire held in the art and as the result, we have not completed the present invention.

The present invention relates to a method of the preparation of pattern designs for printing, in which a shadow of an opaque article having a specific shape and structure, which is interposed between two confronting polarizing plates, is utilized and a basic original photograph is prepared by superposing the shadow of the specific shape and structure integrally on an interference pattern.

More specifically, in accordance with the present invention, there is provided a method of the preparation of pattern designs for printing, which comprises interposing a light-transmitting interfering article composed of a transparent substance such as a vinyl resin, cellophane, a plastic material or mica between two confronting polarizing plates, further interposing an opaque article formed to have a specific shape and structure between one polarizing plate and said transparent substance, projecting light beams through said polarizing plates, forming an interference color pattern or a specific shape and form by changing the angles of the polarizing plates to the optical axis, changing the thickness, shape and light-refracting state of the interfering article composed of the transparent substance or moving one or both of the polarizing plates with the optical axis being as the rotation axis, forming an optical image by partially intercepting the interference color pattern by the opaque article having the specific shape and structure, photographing said optical image to form an original photograph in which the shadow of the specific shape and structure of said opaque article is superposed integrally on the interference color pattern, and forming an intended pattern design based on said original photograph according to customary procedures.

BRIEF DESCRIPTION OF THE DRAWINGS

These and other objects and features of the present invention will clearly be understood by the following description with reference to the accompanying drawings, in which:

FIG. 2 is a diagram illustrating constituent elements of the apparatus shown in FIG. 1;

DETAILED DESCRIPTION OF THE PREFERRED EMBODIMENTS

The principle and embodiments of the present invention will now be described with reference to the accompanying drawings.

Figure 1:
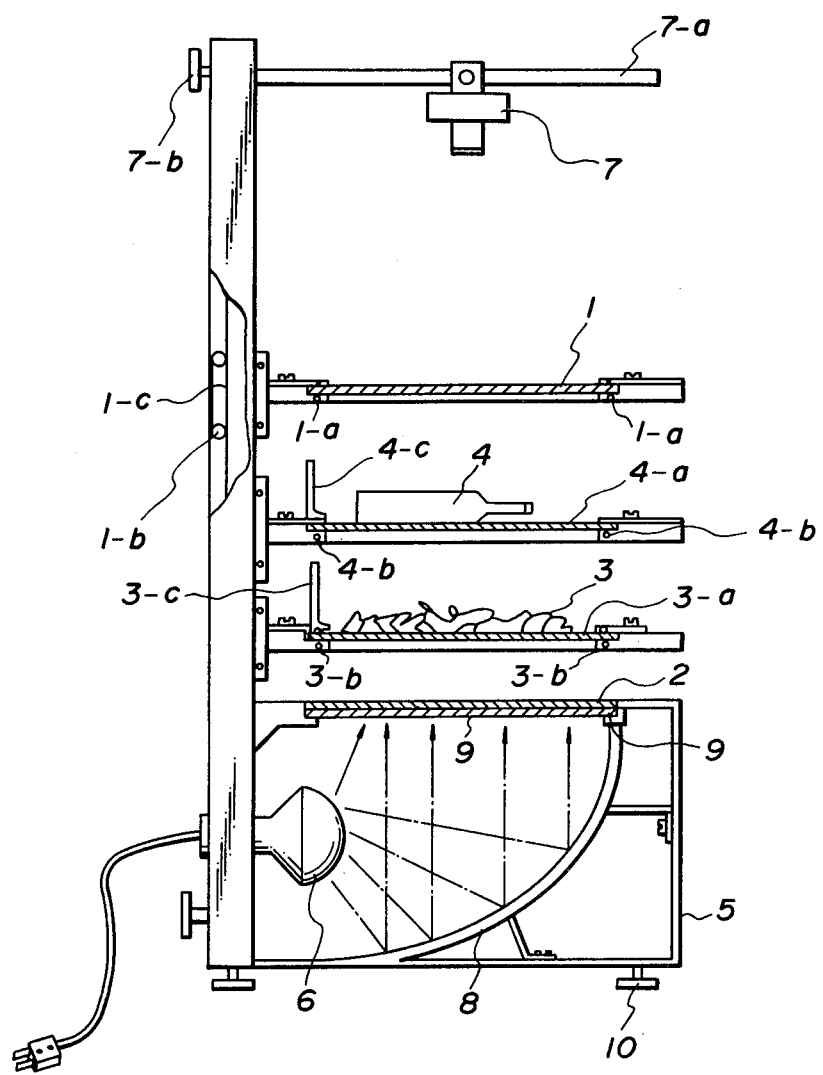
FIG. 1 is a diagram illustrating an apparatus for use in carrying out the present invention.
Figure 3:
FIGS. 3, 4, and 5 show original photographs of interference patterns partially intercepted by shadows of opaque articles.
Figure 4:

Referring to FIG. 1, a light-interfering, light-transmitting transparent substance 3 is interposed between polarizing plates 1 and 2, and an opaque article 4 formed to have a specific shape and structure is further interposed between one polarizing plate 1 and the transparent substance 3. When light beams are projected from a light source device 5 and transmitted through the other polarizing plate 2, the polarized beams formed by passage through the polarizing plate 2 are separated by the function due to the crystal structure of the transparent substance 3 and a pattern of a specific interference color is formed by the interference phenomenon caused when these polarized beams pass through the polarizing plate 1. This interference color pattern is caught as an optical image partially intercepted by the shadow of a specific shape and structure formed by the opaque article 4 interposed between the polarizing plate 1 and transparent substance 3. This optical image is photographed by a camera 7 disposed outside the polarizing plate 1, whereby there is obtained an original photograph (negative plate) in which the shadow of the specific shape and structure owing to the opaque article is superposed integrally on the abovementioned interference color pattern (see FIGS. 3 and 4). In this case, by the interaction of the two polarizing plates and the transparent substance interposed therebetween, the shape and form of the interference pattern is changed in various manners. Accordingly, by changing the kind and shape of the interposed transparent substance, changing the relative positions of the two polarizing plates by movement and rotation or changing the angles of the polarizing plates to the optical axis, an interference color pattern of a desired shape and form can be obtained. If these operations are carried out mechanically, the formed interference color pattern can be changed in various manners regularly and continuously. For example, when the relative positions of the polarizing plates are changed by rotation thereof, changes of the hue are caused in the direction of the complementary color until the polarizing axes of the polarizing plates cross each other at a right angle, and during this period, the pattern is continuously and regularly changed. Accordingly, the technique of forming a valuable interference color pattern by rotating one or both of the polarizing plates continuously and regularly and changing the angle between the polarizing axes of both the polarizing plates under delicate and fine adjustment becomes important. Of course, since the interference color pattern is changed by changes of the kind and shape of the interposed transparent substance, also selection of the kind and shape of the transparent substance is important. As the transparent substance, there are preferably used cellophane, a vinyl resin, a plastic material or mica. However, in the present invention, there can be used any of other light-interfering, light-transmitting substances. As regards the configuration of the transparent substance, an article formed by bending a film of the transparent substance or by perforating a film of the transparent substance under heating is effectively used. However, a thick article of an indefinite shape formed by plastic processing, or an article having an appropriate irregular varying shape formed by pressing, cutting processing or heating, is preferably used.

Various articles differing in the shape, structure and material may be used as the opaque article 4 having a function to partially intercept the interference color pattern formed by the mutual action of the two polarizing plates 1 and 2 and the transparent substance 3 interposed therebetween. For example, there can be used papers, cloths, metal plates, opaque coloring dyes, paints, synthetic resins, plants and other materials capable of intercepting light beams. As the shape and structure of the opaque article, there can be mentioned linear marks for indicating valuable design portions to be separated from the interference color pattern, marks (designs) for indicating the portions to be separated by cutting, which correspond to dress patterns for cutting of a fabric, and other appropriate mesh-pattern marks, rhombic marks, rectangular marks and the like marks and symbols. In short, the shape or structure of the opaque article 4 are not particularly critical. For example, when a glass sheet having a design corresponding to a dress pattern for cutting of a fabric (drawn by an opaque coloring paint) is interposed between the polarizing plate 1 and the transparent substance 3 to form an optical image by partially intercepting the interference color pattern with the above-mentioned design pattern and the optical image is photographed, there can be obtained an original photograph in which the shadow of the opaque article, that is, the opaque coloring paint, is superposed on the interference color pattern (see FIG. 3). Of course, the shape of the portion to be intercepted can appropriately be changed according to the intended use of the original photograph.

The structure of the light source device 5 is not particularly critical, so far as the device 5 can project light beams substantially at a right angle to the polarizing plate 2. A reflecting plate 8 and a light-spreading plate 9 may be interposed between a light source 6 and the polarizing plate 2. The quality and quantity of the light are not particularly critical. The polarizing plate 1 (or the polarizing plate 2 or both) is supported by polarizing plate-rotating rollers 1-a so that the polarizing plate can be rotated with the optical axis being as the rotation axis, and the space between the polarizing plates 1 and 2 can be adjusted by upper and lower rollers 1-b. The opaque article 4 is placed on a support stand 4-a formed of a glass sheet or the like, and the supporting stand 4-a is supported by stand-supporting rotary rollers 4-b so that the supporting stand 4-a as a whole can be rotated with rotation of these rollers. Similarly, the transparent substance 3 is placed on a transparent substance-supporting stand 3-a, and if desired, the supporting stand 3-a is supported by supporting stand-rotating rollers 3-b so that the supporting stand 3-a as a whole can be rotated with rotation of these rollers. As in case of the space between the polarizing plates, the spaces between these stands and the polarizing plates are adjusted by upper and lower rollers. Of course, a light-transmitting plane plate, other than the glass plate, can be used for such supporting stand.

Preparation of an original photograph by the actual operation of the optical image-forming apparatus using the above-mentioned polarizing plates and preparation of a printing design by using this original photograph as a basic photographic plate will now be described.

Figure 6:
FIG. 6 shows an original photograph of an interference pattern partially intercepted by the shadow of a specific commercial article.
Figure 5:
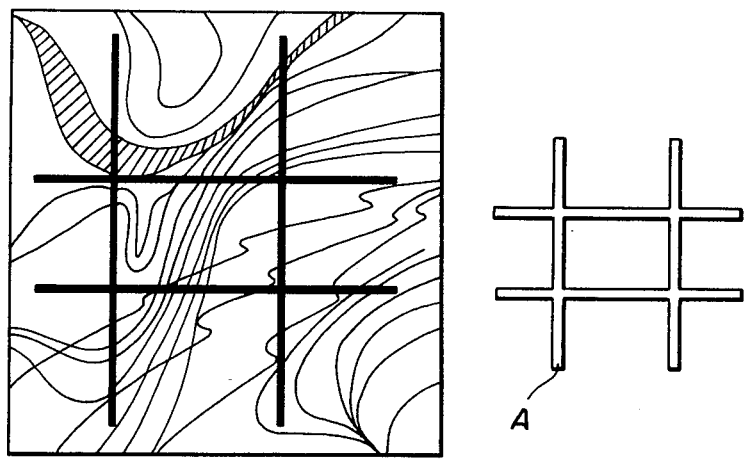
Figure 7:
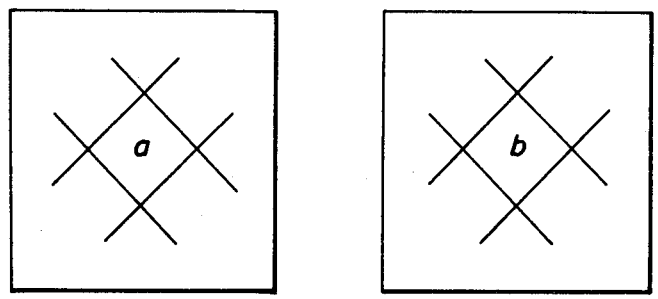
FIG. 7 is a diagram showing two different kinds of original units.

At first, the distances among the two polarizing plates 1 and 2, the opaque article-supporting stand 4-a and the transparent substance-supporting stand 3-a are appropriately adjusted, and by rotating the stands 4-a and 3-a, they are set at appropriate positions. Then, light beams are projected from the light source device 5 and the polarizing plate 1 is rotated to form an interference color pattern, and the rotation position of the polarizing plate 1 is set so as to obtain a desired pattern. Then, for example, a metal plate which is punched to form a plurality of square units (see FIG. 5-A) is placed on the opaque article-supporting stand 4-a composed of glass, and the set position of the thus meshed metal plate is minutely adjusted so as to select a pattern corresponding to a valuable basic design portion among interference color patterns caught on the finder of the camera 7. If necessary, the metal plate is fixed and secured at this position by a fixing device 4-c. Then, the formed optical image is photographed. Thus, an original photograph having an interference color pattern partially intercepted by square shadows of the metal plate is prepared. In this case, various interference color patterns partially intercepted by shadows of appropriate shapes can be formed by changing the shape and form of the metal plate in various manners. Accordingly, the application range can remarkably be broadened. For example, this method can be applied not only to formation of the above-mentioned marks for indicating portions of an original photograph to be separated by cutting and for indicating portions of a printed fabric to be cut, that is, indicating the marks acting as so-called design patterns for fabrics, but also to formation of photographic plates for use in advertisement of special commercial products. In this case, such specific commercial product is used as the opaque article. In this case, it is preferred to use, as the stand 4-a for supporting the commercial product, that is, the opaque article, a light-intercepting plate allowing passage of beams from the light source 6 alone but absorbing beams from the camera side. Furthermore, there may be adopted an arrangement in which a certain spot light is projected to the commercial product or a soft light is projected entirely to the commercial product to catch a clear image of the entire commercial product. According to the above-mentioned procedures, an original photograph having a clear picture image of the commercial product under the background of the interference color pattern can easily be obtained by one step. Therefore, the application range of the original photograph in the field of advertisement of commercial products can remarkably be broadened (see FIG. 6).

Figure 8:
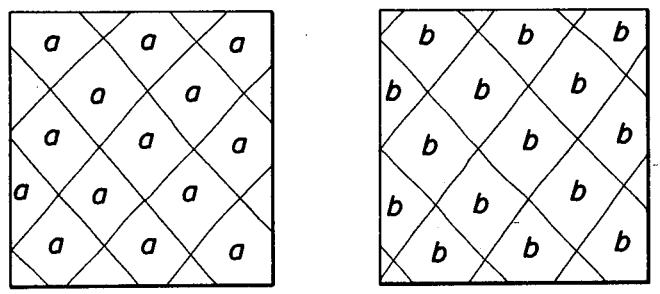
FIGS. 8 and 9 show arrangements of the original units shown in FIG. 7.
Figure 9:
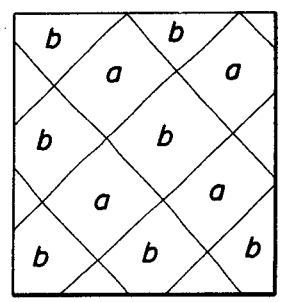

According to the intended use, the so prepared original photograph is cut along marks indicated by the shadow of the opaque article to form a valuable design unit. A plurality of such basic design units are arranged as shown in FIGS. 8 and 9, and then adjusted and montaged. After enlargement or reduction to a desired size, a printing design is prepared according to customary photographing procedures. According to the present invention, an original photograph consisting solely of design portions having a very high commercial value is obtained based on the schematic study and analysis of changes of interference color patterns, and therefore, this original photograph can directly be used as a printing design (see FIGS. 3 and 4) in many cases.

The present invention having the above-mentioned basic structure has various excellent advantages over the conventional technique of preparing printing designs. These advantages will now be summarized.

The present invention is different from the conventional technique where a transparent substance is interposed between two polarizing plates and light beams are projected to the polarizing plates to catch the resulting interference color and the shape and pattern formed thereby. More specifically, according to the present invention, an opaque article formed to have a specific shape and structure is further interposed between one polarizing plate and the transparent substance, a shadow is formed based on this opaque article and an interference color pattern partially intercepted by this shadow is caught as an optical image. The most characteristic feature of the present invention resides in this point. Since an original photograph is prepared by photographing this optical image, by changing the shape and structure of the opaque article, the interference color pattern can partially be intercepted by the shadow of the corresponding shape and structure. Therefore, the time and labor can remarkably be saved in the present invention. More specifically, in the conventional method, there should have be adopted complicated steps of catching only the interference color pattern, photographing the caught pattern to form an original photograph, finding necessary pattern portions in the original photograph, tracing this pattern portion while dividing it into rhombic, square or rectangular units, cutting the photograph to separate the units, arranging and combining these units to form a generic design and montaging the same. In the conventional method, since the operations of finding pattern portions valuable as original units, tracing them while dividing them into rhombic, square or rectangular units and cutting out the traced portions are performed independently from the photographing process, large quantities of labor, time and expense are required in the conventional method. According to the present invention, this disadvantage is drastically overcome, because all the operations, except the cutting operation, can be completed simultaneously with the photographing operation. Therefore, according to the present invention, a printing design can be prepared at a very high efficiency with a high labor-saving effect economically advantageously, and this operation of forming printing designs can be completed in a very short time.

Not only two-dimensional articles such as a punched hard paper and a glass plate coated with an opaque coloring paint but also three-dimensional articles such as three-dimensional commercial products can be used as the opaque article. In the latter case, the interference color pattern acting as the background pattern for the main picture image of a commercial product or the like is utilized as an advertising design pattern for increasing the commercial value of the commercial product. Therefore, the method of the present invention is very valuable for forming an original photograph for advertising a specific commercial product and also for forming a design based on this original photograph. Moreover, a plant body or animal body may be used as well as such three-dimensional commercial product. Accordingly, if an appropriate article is chosen as the opaque article, designs for interior decoration and designs to be used in various other fields can be prepared according to the present invention.

In the optical image-forming apparatus that is used in the present invention, an automatic control device for continuously adjusting and controlling the rotation of the polarizing plates minutely can be co-operatively connected to a driving system, and therefore, it becomes possible to interlock rotation of the polarizing plates with the operation of a shutter of the camera, thereby catch continuously changes of the interference color pattern with rotation of the polarizing plates and study and analyze changes of the interference color pattern systematically. If such systematic study and analysis of changes of the interference color pattern are possible, necessary data are accumulated, and therefore, excellent printing designs can be prepared. This becomes possible only when the same interference color pattern can be reproduced continuously by utilizing the above-mentioned automatic control device. In other words, this cannot be attained by the conventional method in which the polarizing plates are manually rotated. This automatic control of rotation of the polarizing plates can be accomplished by interlocking an ordinary automatic rotation control device including an ordinary micro-computer and a rotation-measuring device with the polarizing plate-rotating rollers and the roller-driving device, and a control apparatus system that can be used in carrying out the method of the present invention is constructed by thus assembling these devices. As pointed out hereinbefore, the optical image-forming apparatus that is used in the present invention is one constructed based on the new technical idea developed by us. As the automatic control system to be interlocked with this optical image-forming apparatus, there may be used a known system directly without any modification. By using this automatic control system, it becomes possible to study and analyze changes of the interference color pattern and accumulate analysis data, and therefore, the utilizability of the interference color pattern is remarkably increased.

The present invention is very valuable as means for forming symbols or marks indicating cutting lines on fabrics or buttoning points on original units of a printing design. More specifically, in printing fabrics of natural fibers such as silk and cotton fibers or fabrics of synthetic fibers such as nylon or polyester fibers based on the original photograph prepared according to the above procedures, the present invention is very effective for marking cutting lines and the like on the fabrics at the printing step according to the intended use of the fabrics. According to the present invention, all the steps of preparing an original photograph, preparing a printing design and cutting a fabric printed according to the printing design can be performed completely premediately. Therefore, as compared with the conventional technique where these steps are performed separately, the present invention is quite rational and important for establishing a massproduction system. Furthermore, the present invention can be applied to formation of a special photographic original and formation of a silk screen, and the obtained design can also be used as a teaching material for creative education or color analysis. Since the present invention is thus applied broadly in various fields, the practical value of the present invention is very high and is very important as a technique having new application ranges.

As will be apparent form the foregoing description, the present invention is characterized in that a transparent substance is interposed between two polarizing plates, an opaque article having an appropriate shape is further interposed between one polarizing plate and the transparent substance, an interference color pattern partially intercepted by the shadow of the opaque article is formed, the so partially intercepted interference color pattern is photographed to form an original photograph on which indicating marks and the like are formed by the shadow of the opaque article on the interference color pattern according to the intended use and a printing design is prepared based on said original photograph. Accordingly, the present invention makes great contributions to the art as an epoch-making technique of completing the operation of forming such indicating marks at the photographing step and as a technique capable of mass-producing printing designs at a high efficiency economically advantageously.

What is claimed is:

1. A method for the preparation of colored pattern designs for printing which comprises the steps of
   (a) mounting two confronting polarizing plates about an optical axis at a spaced distance apart,
   (b) interposing a light-transmitting interfering transparent substance between said two confronting polarizing plates,
   (c) interposing an opaque article having a specific shape and structure between one of said two polarizing plates and said transparent substance,
   (d) projecting light beams through the assembly formed by steps (a), (b) and (c) to there establish a colored pattern design,
   (e) varying said colored pattern design by (1) adjusting the angles of the polarizing plates with respect to their optical axis, and/or
(2) varying the thickness, shape and light-refracting state of said interfering light-transmitting transparent substance, and/or
(3) moving at least one of said polarizing plates about the optical axis, and/or
(4) adjusting the position of said opaque article to thereby form an optical image having the desired colored pattern design,
(f) photographing said formed optical image to produce an original photograph in which the shadow of said opaque article is superposed integrally on the interference color pattern, and
(g) forming a pattern design based on said photograph.

2. A method for the preparation of printing pattern designs according to claim 1 wherein the light-transmitting interfering substance is a vinyl resin, cellophane, a plastic material or mica.

3. A method for the preparation of printing pattern designs according to claim 1 wherein the light-transmitting interfering transparent substance is in the form of a film.

4. A method for the preparation of printing pattern designs according to claim 3 wherein the film of the transparent substance is one obtained by bending processing, heat-perforating processing, plastic processing into a thick indefinite form, press processing or cutting processing.

5. A method for the preparation of printing pattern designs according to claim 1 wherein the opaque article formed to have a specific shape and structure is a paper, a cloth, a metal plate, an opaque coloring dye, a paint, a synthetic resin film or a plant.

6. A method according to claim 1 wherein the opaque article forms symbols or marks indicating cutting lines on fabrics.

* * * * *